Aug. 30, 1938.   H. R. SNOW   2,128,502
DECOMPOSITION OF HYDROCARBON OILS
Filed Feb. 14, 1930   2 Sheets-Sheet 2

Inventor:
Harold R. Snow,
By Dyrenforth, Lee, Chritton and Wiles,
Attys.

Patented Aug. 30, 1938

2,128,502

UNITED STATES PATENT OFFICE 2,128,502

DECOMPOSITION OF HYDROCARBON OILS

Harold R. Snow, Hammond, Ind., assignor to Standard Oil Company, Whiting, Ind., a corporation of Indiana Application February 14, 1930, Serial No. 428,430

4 Claims. (Cl. 196—61)

The present invention relates to improvements in processes for the decomposition of hydrogen oils for the production of lighter hydrocarbon oils, suitable for motor fuel use, for example, in the gasoline range of boiling points by cracking effected in the vapor phase. It will be fully understood from the following description, illustrated by the accompanying drawings, in which.

Figure 1:
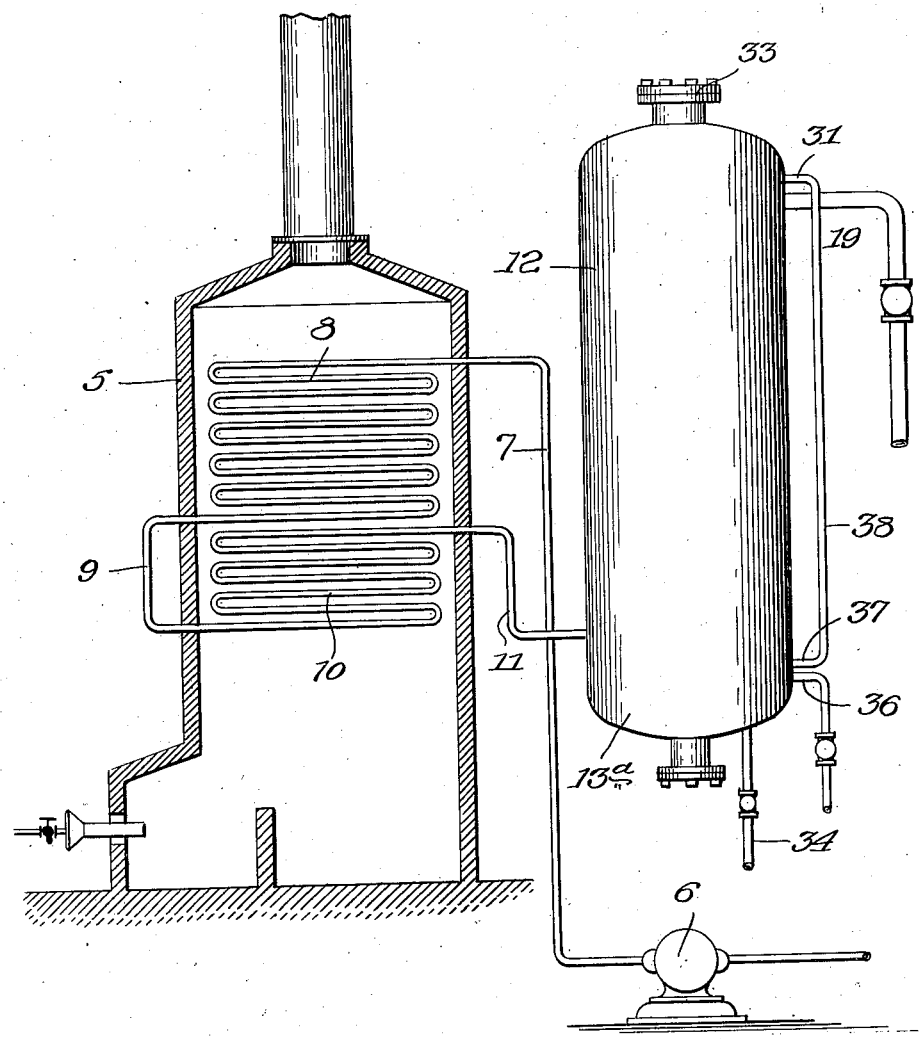
Figure 1 is a diagrammatic layout of a portion of apparatus suitable for carrying the present invention into effect.

Referring to the drawings, the numeral 5 indicates a pipe still furnace of suitable design for use in vapor phase cracking, for example, one such as is described in the co-pending application of myself and others, Serial No. 427,216, filed Feb. 10, 1930, which has issued as Patent 1,918,991. In such a furnace the feed to the coil, suitably a composite stock consisting partly of fresh oil and partly of cycle stock derived in the course of the operation, may be supplied under suitable pressure by the pump 6 through the line 7 to an initial heating section 8 of a pipe still, where it is brought to an elevated temperature below that at which rapid vaporization and decomposition begins. The oil then passes through line 9 to a hotter section of the furnace, and passes through the vaporizing and cracking coils 10, wherein it is rapidly vaporized and brought to an effective cracking temperature at which the desired type of cracking will be secured. The products then pass out through the line 11 and enter the reaction chamber 12, wherein a further conversion of the vapors is effected. In general, it is desirable that a substantial amount of cracking takes place during the passage of the oil through the pipe still 10.

The reaction chamber 12 is preferably a vertically disposed, elongated shell, suitably of cylindrical form and, in the operation of the process, is maintained largely filled with vapors, only a low level of tarry liquid 13ª being permitted therein, if any. Thus, in a vertical reaction chamber, about forty feet high, the level of tarry liquid is not permitted to exceed two to three feet.

In the operation of the reaction chamber, in accordance with the present invention, turbulence in the vapor space is avoided, to an extent indicated by the temperature gradient between the vapors in the reaction chamber near the inlet thereinto and those near the vapor outlet therefrom. Although it would appear, by reason of the increasing density of the vapors as they cool, that vapors should be introduced in the upper portion of the reaction chamber and withdrawn from the lower portion, I have found that in actual operation, such procedure is conducive to turbulence and mixing of the vapors. It has been found that turbulence may be best avoided by introducing the vapors from the heating coil in the proximity of the bottom of the reaction chamber, preferably through a nozzle of gradually expanding form to avoid jet action and resulting turbulence, and to remove the vapors from a point near the top of the enlarged chamber.

Although many types of expanding nozzles may be employed for the introduction of the vapors, I prefer to employ a nozzle as illustrated in the drawings, the specific form of which is described and claimed in the co-pending application of myself, Serial No. 428,431, filed Feb. 14, 1930, which has issued at Patent 1,911,476. The vaporized, decomposing products from the heating coil enter through pipe 11 and are directed downwardly through elbow 13 into the interior of the flaring or conical plate 14. Below the plate 14 and spaced from its margin is the slightly dished baffle plate 15. The incoming products are discharged through the circular opening between the flaring plate 14 and the baffle plate 15, the marginal portion of the former, designated 17, being curved upwardly to form a further enlarged jet opening and reduce the turbulence due to the entering jet. The inlet is positioned above the level of the tarry liquid in the lower portion of the reaction chamber 12, and by the baffle plate 15, direct contact with the tarry liquid is prevented and the vapors are directed smoothly laterally. By such an expanding opening for the supply of the vapors from the heating coil within the reaction chamber, turbulence of the vapors within the latter is largely prevented.

The vapors rise slowly through the reaction chamber, in which the desired vapor phase cracking temperatures are maintained, and the flow of oil through the system is controlled so that the desired amount of cracking is effected therein. The reaction chamber may be insulated, or may be mildly heated, if desired.

In order to avoid coke formations of an objectionable character upon and within the vapor outlet, I have found it desirable to introduce cooling liquid into the vapor outlet, preferably a liquid which is not entirely vaporized. The unvaporized oil is removed from the reaction chamber with the cracked vapor products by entrainment. A hydrocarbon liquid is prepared and may suitably be the fresh feed for the system, which is thereby preheated and redistilled, and blended with the vaporized cracked products, to be later condensed with the heavier portions of the latter to form a composite feed stock for the heating coil and for the cracking operation.

Figure 2:
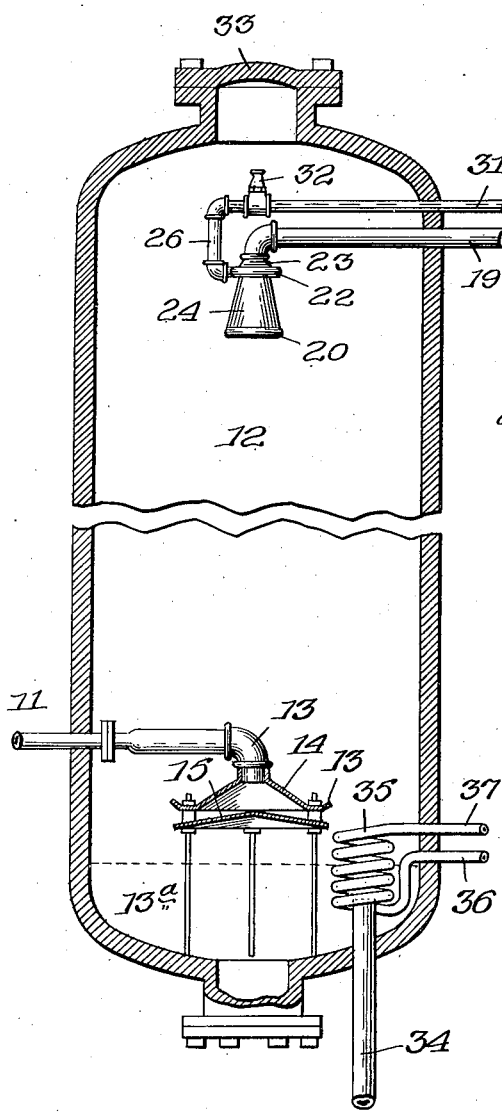
Fig. 2 is a vertical sectional view through a reaction chamber suitable for carrying the invention into effect.
Figure 3:
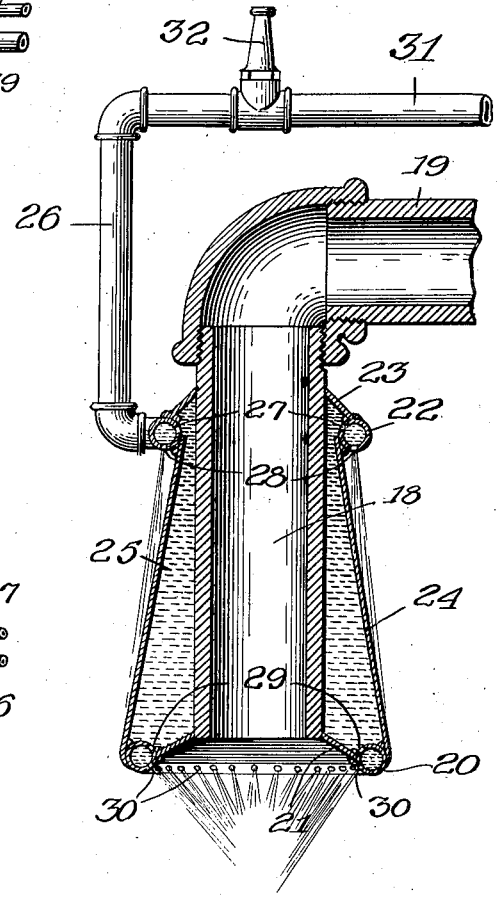
Fig. 3 is a detail sectional view through the vapor outlet of the reaction chamber.

Although the desired results may be secured, to a marked extent, by the simple injection of a suitable hydrocarbon liquid or feed stock into the vapor outlet, I have found a construction of vapor outlet such as is shown in Figs. 2 and 3 to be particularly advantageous. In these figures, 18 represents the depending opening of the vapor outlet, connected to the vapor line 19. At, or slightly below the opening of the depending outlet portion 18 there is provided an encircling pipe ring 20, secured to the outer edge of the outlet section 18 by the sheet metal ring or cone 21. A similar pipe ring 22, somewhat smaller in diameter, surrounds the depending outlet portion 18 at a somewhat higher elevation, being secured thereto by the sheet metal cone or ring 23. The inner portion of the ring 22 and the outer portion of the pipe ring 20 are connected by the sheet metal shell or cone 24, the various parts being secured together, most conveniently by welding. There is thus formed within the metal shell or cone 24 a chamber or enclosure 25 surrounding a large portion of the depending vapor outlet 18. Obviously, it may be proportioned to surround the entire outlet 18, if desired.

The cooling liquid, suitably a distillate hydrocarbon or the feed stock for the system, is fed to the pipe ring 22 through the pipe 26. The pipe ring 22 is provided with perforations 27 opening interiorly so as to feed oil into the space or enclosure 25 and also with perforations 28 to spray a jet of oil upon the shell or cone 24. The pipe ring 20 is provided with perforations 29 communicating with the space 25, through which the pipe ring 20 receives oil discharged into the space or enclosure from the pipe ring 22. The oil thus received is discharged through the perforations 30 into the vapors entering the outlet 18. The oil supplied through the line 26 is partially vaporized and exerts a cooling effect both interiorly and exteriorly on the vapor outlet 18, effectively preventing coke formations which would cause stoppage of the operation.

The feed stock for the system, or such other cooling medium that may be employed, is supplied through the line 26 by means of the line 31 which also communicates with the nozzle 32 directed upwardly toward the top of the reaction chamber 12 in order to prevent the formation of coke deposits in the upper portion of this chamber and on the manhead 33. By the supply of vaporizable oil in a similar manner localized vapor cooling may be effected whereby it is found desirable to avoid coke deposits.

The vapors withdrawn from the reaction chamber through the outlet pipes 18 and 19 pass to any suitable fractionating device (not shown) to condense therefrom vaporized products heavier than the desired distillate products or motor fuel, which condensed products will include the fresh feed if the oil intended for the feed to the system is introduced as hereinbefore suggested, as a cooling medium to prevent coke deposits in the vapor outlet from the reaction chamber. Suitable fractionating means for handling the vapors from the reaction chamber are shown in the co-pending application of myself and others, Serial No. 527,216, filed Feb. 10, 1930, which has issued as Patent 1,918,991.

Tarry liquid may be removed from the enlarged chamber through the outlet line 34, which projects upwardly somewhat into the lower portion of the reaction chamber. In order to avoid coke deposits upon and in this outlet, I provide a helical coil 35, of a diameter somewhat larger than the exterior of the coil outlet 34. This coil enters the reaction chamber somewhat above the level of tarry liquid therein, and depends to a point adjacent or somewhat below the opening of the outlet 34, partially surrounding the latter. A cooling oil fed into this coil through the line 36, passes through the helical coil and out through the line 37. If desired, the oil employed for cooling the tarry liquid in proximity to the liquid outlet 34 may be the same as is employed in cooling the vapor outlet 18 (for example, feed stock for the system), and in such case, the outlet 37 of the coil 35 may communicate with the line 38 by which the oil is conveyed to the line 31.

The invention may suitably be employed in connection with vapor phase cracking operations, such as those described in the application of myself and others, Serial No. 427,216, filed Feb. 10, 1930, which has issued as Patent 1,918,991, above referred to, wherein a vapor phase cracked motor fuel having an anti-knock value exceeding 1.5 cc. lead equivalent, as compared with Mid-Continent gasoline is produced, and wherein the operation is so conducted as to maintain a coil outlet temperature of 850° to 975° F., a pressure in the reaction chamber of 100 to 250 lbs. and a temperature in the reaction chamber exceeding 850° F. with a total cracking per pass varying from a minimum of about 2.5% gasoline in the case of the lower pressure operations to a minimum of about 13.2% in the case of the higher pressure operations, from ¼ to ¾ of the cracking being secured in the reaction chamber. The present invention is, however, adapted to be employed in the operation of any vapor cracking system, including atmospheric pressure operations and high pressure operations such as those conducted at 700 to 900 lbs. pressure, and in operations wherein vapor phase temperatures are employed reaching as high as 1100 to 1300° F., or higher, or wherever a substantial amount of conversion is desired in a vapor body.

Although I have described the present invention in connection with a description of specific embodiments thereof, it is not intended that the details set forth shall be regarded as limitations upon the scope of the invention, except in so far as included in the accompanying claims.

I claim:

1. In a cracking operation wherein an enlarged chamber is maintained at cracking temperature and partly filled with vapors and partly filled with liquid and wherein liquid is continuously withdrawn from said chamber, passing a stream of cooling fluid in indirect heat conductive relation with substantially only that portion of the liquid within the chamber which is in immediate proximity to the point of withdrawal while avoiding any substantial cooling of the remainder of said liquid within said chamber, thereby preventing coke deposits at the point of withdrawal of the liquid, and separately withdrawing the spent cooling fluid from said enlarged chamber.

2. In a cracking operation wherein an enlarged chamber is maintained at cracking temperature and partly filled with vapors and partly filled with liquid and wherein liquid is continuously withdrawn from said chamber, removing said liquid from the enlarged chamber through a conduit projecting into the body of liquid, passing a fluid cooling medium in indirect heat conductive relation with substantially only that portion of the liquid within the chamber which is in immediate proximity to said conduit and to the opening thereof while avoiding any substantial cooling of the remainder of said liquid within said chamber, thereby preventing coke deposition by the withdrawn liquid, and separately withdrawing the spent cooling fluid from said enlarged chamber.

3. The method of effecting decomposition of hydrocarbon oils in the vapor phase to produce lighter products in the gasoline boiling point range therefrom, which comprises heating the hydrocarbon oil to vaporize the same and bring the vapors to cracking temperature, introducing the vapors into the lower portion of an enlarged chamber wherein tarry liquids separate from the oil vapors, the heated vapors being introduced into said chamber above the level of liquid therein and at a low velocity to prevent turbulence in the vapors in the chamber, removing tarry liquids from the lower portion of the chamber to maintain a low level thereof, directly cooling only that portion of the said tarry liquid within said chamber which is in immediate proximity to the point of withdrawal thereof, removing vapors from the upper portion of said chamber, and maintaining a cracking temperature in the vapors in said chamber.

4. The method of effecting decomposition of hydrocarbon oils in the vapor phase to produce lighter products in the gasoline boiling point range therefrom, which comprises heating the hydrocarbon oil to be treated to vaporize the same and bring the vapors to cracking temperature, introducing the vapors into the lower portion of an enlarged chamber wherein tarry liquids separate from the oil vapors, the heated vapors being introduced into said chamber above the level of liquid therein and at a low velocity to prevent turbulence in the vapors in the chamber, removing tarry liquids from the lower portion of the chamber to maintain a low level thereof, cooling only that portion of the liquid body within the chamber which is substantially only in immediate proximity to the point of removal of tarry liquids in the chamber, removing vapors from the upper portion of said chamber, cooling substantially only that portion of the vapors in said chamber which are in immediate proximity to the point of removal thereof by the introduction of a liquid cooling medium into said vapors, causing substantially all of the cooling medium to be carried out of the said chamber by the said vapors being removed therefrom and maintaining a cracking temperature in the vapors in said chamber.

HAROLD R. SNOW.